United States Patent

Stommen et al.

[11] Patent Number: 5,844,379
[45] Date of Patent: Dec. 1, 1998

[54] CIRCUIT ARRANGEMENT FOR IGNITING A HIGH PRESSURE DISCHARGE LAMP

[75] Inventors: Theodorus H. Stommen; Theodorus M. Hendriks, both of Eindhoven, Netherlands

[73] Assignee: U.S. Philips Corporation, New York, N.Y.

[21] Appl. No.: 923,047

[22] Filed: Sep. 3, 1997

[30] Foreign Application Priority Data

Sep. 5, 1996 [EP] European Pat. Off. .............. 96202472

[51] Int. Cl.$^6$ .................................................. H05B 41/16
[52] U.S. Cl. ......................... 315/273; 315/272; 315/310; 315/209 R; 315/DIG. 5; 315/DIG. 7
[58] Field of Search .......................... 315/209 R, 200 R, 315/224, 272, 273, 283, 307, 310, DIG. 5, DIG. 7

[56] References Cited

U.S. PATENT DOCUMENTS

| | | | |
|---|---|---|---|
| 4,695,770 | 9/1987 | Raets | 315/207 |
| 5,319,286 | 6/1994 | Leyten | 315/289 |
| 5,514,938 | 5/1996 | Zaaijer et al. | 315/291 |
| 5,534,753 | 7/1996 | Blom et al. | 315/244 |

FOREIGN PATENT DOCUMENTS

| | | |
|---|---|---|
| 4412518A1 | 10/1994 | Germany . |
| 5258879 | 10/1993 | Japan . |
| 5258880 | 10/1993 | Japan . |

*Primary Examiner*—Don Wong
*Assistant Examiner*—Haissa Philogene
*Attorney, Agent, or Firm*—Edward Blocker

[57] ABSTRACT

The invention relates to a circuit arrangement for operating a high-pressure discharge lamp. A buffer capacitor is shunted by a branch which comprises a series circuit of a second capacitor and a unidirectional element for blocking a current with which the second capacitor charges the buffer capacitor Re-ignition after a zero crossing of the low-frequency alternating current has a comparatively high amplitude so that the lamp re-ignites in a reliable manner.

6 Claims, 1 Drawing Sheet

CIRCUIT ARRANGEMENT FOR IGNITING A HIGH PRESSURE DISCHARGE LAMP

BACKGROUND OF THE INVENTION

The invention relates to a circuit arrangement for operating a high-pressure discharge lamp, provided with first capacitive means C1,
a commutator for generating a low-frequency alternating current through the high-pressure discharge lamp from a DC voltage present across the first capacitive means, which commutator comprises
input terminals coupled to the first capacitive means,
a load branch which comprises terminals for connection of the high-pressure discharge lamp and inductive means L1.

Such a circuit arrangement is known from DE 4412518A1. A substantially constant DC voltage is present across the first capacitive means C1 in the known circuit arrangement during lamp operation. The commutator is formed by a bridge circuit consisting of a first and a second series arrangement of two switching elements, which two series arrangements each interconnect the input terminals of the commutator. The load branch is formed by a series circuit of the terminals for connecting the high-pressure discharge lamp (also called lamp below) and inductive means L1. The load branch connects a common junction point of the two switching elements in the first series arrangement to a common junction point of the two switching elements in the second series arrangement. A first pair and a second pair of switching elements is rendered conducting and non-conducting alternately, with the result that a low-frequency alternating currents through a lamp connected to the terminals is generated from the substantially constant DC voltage present across the first capacitive means.

The lamp must be re-ignited at each zero crossing of the low-frequency alternating current through the lamp before the amplitude of the low-frequency alternating current can rise to its maximum value. This re-ignition is realized in the known circuit arrangement by means of a re-ignition voltage pulse whose amplitude and half-value width are determined by the self-inductance of the inductive means L1 and the capacitance of the first capacitive means C1. Since the first capacitive means C1 in the known circuit arrangement act as a buffer capacitor, the capacitance value of the first capacitive means C1 is comparatively high. A result of this is that the amplitude of the re-ignition voltage pulse is comparatively low. Since the amplitude of the re-ignition voltage pulse is comparatively low, it is found that the circuit arrangement is not capable in practice of re-igniting the lamp at each zero crossing of the low-frequency alternating current. The result of this may be that no current flows through the lamp for the duration of half a cycle of the low-frequency alternating current at irregular intervals. The result may also be, however, that the lamp is fully extinguished.

SUMMARY OF THE INVENTION

The invention has for its object to provide a circuit arrangement with which it is possible to re-ignite the lamp in a reliable manner after each zero crossing of the low-frequency alternating current.

According to the invention, a circuit arrangement as mentioned in the opening paragraph is for this purpose characterized in that the first capacitive means C1 are shunted by a branch K which comprises a series circuit of second capacitive means C2 and a unidirectional element D1 for blocking a current with which the second capacitive means C2 charge the first capacitive means C1.

Owing to the presence of the unidirectional element D1, the amplitude of the re-ignition voltage pulse is mainly determined by the capacitance value of the second capacitive means C2, in addition to the self-inductance of the first inductive means L1, and to a lesser extent by the capacitance value of the first capacitive means C1. It is possible to generate re-ignition voltage pulses of a comparatively high amplitude in that the capacitance value of these second capacitive means C2 is chosen to be comparatively small. It was found to be possible to re-ignite the lamp in a reliable manner by means of such re-ignition voltage pulses. It was also found that the amplitude of the low-frequency alternating current drops comparatively steeply before a zero crossing, and rises comparatively steeply after a zero crossing. This comparatively fast commutation also has a positive influence on the re-ignition behavior of the lamp.

The branch K may be so designed that it also comprises an inductive element L2 shunted by a series arrangement of an impedance R and a unidirectional element D2. The impedance R preferably is an ohmic impedance. The inductive element L2 in this embodiment of the branch K contributes to the re-ignition voltage pulse, so that the amplitude of the re-ignition voltage pulse is determined by the self-inductance of the inductive means L1, the self-inductance of the inductive element L2, and the capacitance value of the second capacitive means C2. It should be noted that the inductive means L1 may form part of the circuit arrangement as a separate component, but that they may alternatively be formed by the inductive element L2.

When the circuit arrangement is switched on, the current through the lamp may reach a comparatively high amplitude immediately after lamp ignition because the major portion of the lamp current flows through the impedance R and not through the inductive element L2. The impedance value of the impedance R is chosen to be substantially lower than the impedance value of the inductive means L2. This comparatively high amplitude of the current through the lamp immediately after lamp ignition promotes a good take-over. The term "take-over" is understood to mean here the establishment of a stable discharge in the lamp after lamp ignition. The amplitude of the low-frequency alternating current may also rise comparatively fast after each zero crossing of the low-frequency alternating current because the low-frequency alternating current flows mainly through the impedance R immediately after a zero crossing. The proportion of the low-frequency alternating current flowing through the inductive means L2 rises gradually in each half cycle of the low-frequency alternating current. At the next zero crossing, the proportion of the low-frequency alternating current flowing through the inductive means L2 is sufficiently great for making a substantial contribution to the amplitude of the re-ignition pulse. It is thus achieved in this embodiment of branch K that the inductive element L2 on the one hand contributes to the re-ignition voltage pulse and on the other hand does not hamper a quick rise in the low-frequency alternating current.

Favorable results were obtained by means of a circuit arrangement according to the invention wherein the commutator comprises a bridge circuit.

BRIEF DESCRIPTION OF THE DRAWING

Embodiments of the invention will be explained in more detail with reference to a drawing, in which.

DETAILED DESCRIPTION OF THE PREFERRED EMBODIMENTS

Figure 1:
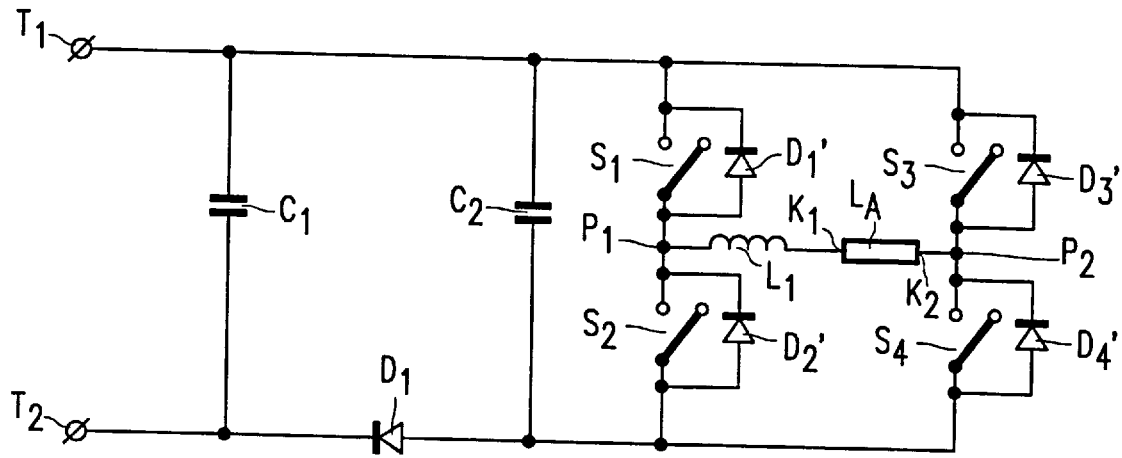
FIGS. 1 and 2 are circuit diagrams, each of an embodiment of a circuit arrangement according to the invention.

In FIG. 1, T1 and T2 are terminals for connection to a DC voltage source. The terminals T1 and T2 are interconnected by capacitor C1 which in this embodiment forms the first capacitive means C1. The capacitor C1 is shunted by a series arrangement of capacitor C2 and diode D1. The series arrangement of capacitor C2 and diode D1 in this embodiment forms a branch K. Capacitor C2 in this embodiment forms second capacitive means C2. Diode D1 forms a unidirectional element D1 for blocking a current with which the second capacitive means C2 charge the first capacitive means C1. Capacitor C2 is shunted by a first series arrangement of two switching elements S1 and S2 and by a second series arrangement of two switching elements S3 and S4. Switching elements S1 to S4 are shunted by respective diodes D1' to D4'. A common junction point P1 of the switching elements S1 and S2 is connected to a common junction point P2 of the switching elements S3 and S4 via a series circuit of coil L1, terminal K1, high-pressure discharge lamp La, and terminal K2, which series circuit forms the load branch in this embodiment. Coil L1 forms inductive means L1 in this embodiment, and terminals K1 and K2 form terminals for connection of the high-pressure discharge lamp. The circuit arrangement is in addition provided with means SC not shown in FIG. 1 for rendering switching elements S1 and S4 on the one hand and switching elements S2 and S3 on the other hand conducting and non-conducting in alternation. Switching elements S1 to S4, diodes D1' to D4', coil L1, terminals K1 and K2, and the means SC together form a bridge circuit which acts as a commutator. The ends of the series arrangements of the switching elements S1 and S2 on the one hand and S3 and S4 on the other hand form the input terminals of the commutator.

The operation of the embodiment shown in FIG. 1 is as follows.

When the terminals T1 and T2 are connected to a DC voltage source, the DC voltage supplied by this DC voltage source will be present across capacitor C1. The means SC render switching elements S1 and S4 on the one hand and switching elements S2 and S3 on the other hand conducting and non-conducting alternately with low frequency. As a result of this, a low-frequency alternating current will flow through the load branch. If the switching elements S1 and S4 are conducting and the switching elements S2 and S3 non-conducting, the low-frequency alternating current will flow from terminal T1 through switching element S1, coil L1, lamp La, switching element S4, and diode D1 to terminal T2. When subsequently the means SC render the switching elements S1 and S4 non-conducting and the switching elements S2 and S3 conducting, the low-frequency alternating current will continue to flow in the same direction for a short time interval owing to the presence of coil L1. During this short time interval, the current flows from point P1 through coil L1, lamp La, diode D3', capacitor C2, and diode D2' back to point P1. The capacitor C2 is charged thereby up to a voltage which is considerably higher than the voltage present across capacitor C1. Capacitor C2 is incapable of charging capacitor C1 owing to the presence of diode D1. The sum of said high voltage across capacitor C2 and the voltage across coil L1 forms a re-ignition voltage pulse which causes the lamp to re-ignite after the amplitude of the low-frequency alternating current has become zero. The amplitude of the re-ignition voltage pulse is determined by the self-inductance value of coil L1 and the capacitance value of capacitor C2. After lamp re-ignition, the current flows from terminal T1 through switching element S3, lamp La, coil L1, switching element S2, and diode D1 to terminal T2 during half a cycle of the low-frequency alternating current. When subsequently the means SC render the switching elements S2 and S3 non-conducting and the switching elements S1 and S4 conducting, the low-frequency alternating current will continue to flow in the same direction for a short time interval owing to the presence of coil L1. During this short time interval, the current flows from point P2 through the lamp La, coil L1, diode D1', capacitor C2, and diode D4' back to point P2, whereby capacitor C2 is charged. The voltage across capacitor C2 together with the voltage across coil L1 forms a re-ignition voltage pulse which causes the lamp to re-ignite after the current through the lamp has become zero.

Figure 2:
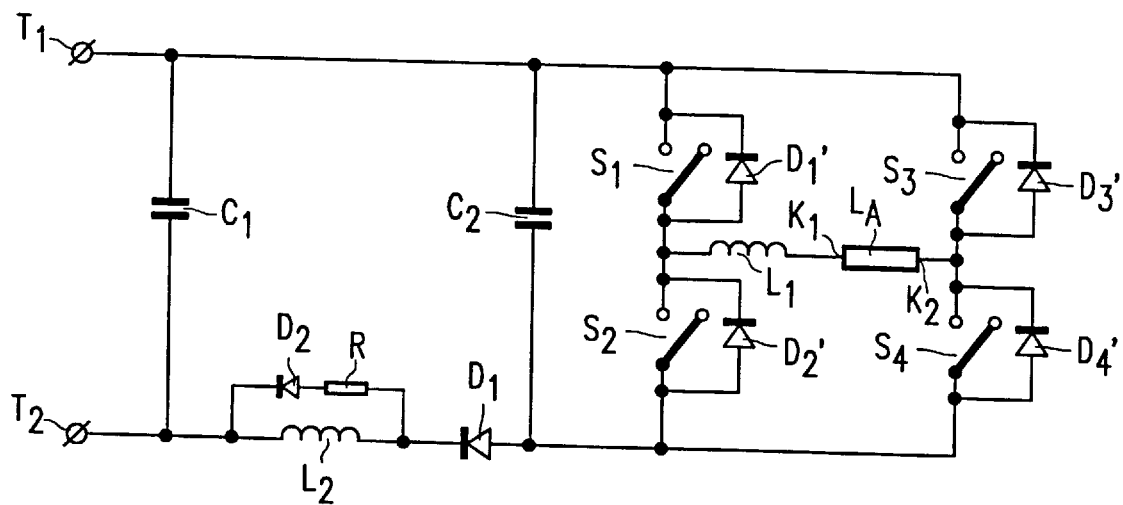

The construction of the embodiment shown in FIG. 2 differs from that of the embodiment shown in FIG. 1 exclusively in that a coil L2 shunted by a series arrangement of ohmic resistor R and diode D2 is included in branch K in series with diode D1. Coil L2 in this embodiment forms inductive element L2, ohmic resistor R forms an impedance R, and diode D2 forms a unidirectional element D2.

The operation of the embodiment shown in FIG. 2 is as follows.

During stationary lamp operation, the series arrangement of ohmic resistor R and diode D2 passes more current than does the coil L2 immediately after each zero crossing of the low-frequency alternating current. The current through the coil L2, however, rises during each half cycle of the low-frequency alternating current, and the current through the series arrangement of ohmic resistor R and diode D2 decreases. During the short time intervals in which the coil L1 charges capacitor C2, the coil L2 will also charge capacitor C2 in that a current flows from terminal T2 through capacitor C1, capacitor C2, diode D1, and coil L2 back to terminal T2. The coil L2 thus makes a contribution to the re-ignition voltage. At the same time, however, the coil L2 forms no impediment to the quick rise in the amplitude of the low-frequency alternating current after a zero crossing because of the shunting arrangement of ohmic resistor R and diode D2. During the take-over and run-up phases of the lamp, the amplitude of the lamp current is substantially higher than during stationary lamp operation. For this reason, the possibility of making the amplitude of the current through the lamp rise quickly is important in particular immediately after ignition during take-over of the lamp and during the run-up. Coil L2 contributes to the ignition voltage pulses because coil L2 increases the amplitude of the voltage across capacitor C2. At the same time, coil L2 forms no impediment to a quick rise in the low-frequency alternating current after lamp re-ignition. It should be noted that, given a correct dimensioning of coil L2, coil L1 may be omitted. In that case the inductive means L1 are formed by coil L2.

Diode D1 renders it possible for capacitor C2 to discharge itself into capacitor C1. The result of this is that a high voltage across capacitor C2 is maintained for a comparatively long time, so that the probability is high that the lamp, if not ignited already at the very beginning of a half cycle, will subsequently ignite within the same half cycle or at the beginning of the next half cycle.

We claim:

1. A circuit arrangement for operating a high-pressure discharge lamp, provided with first capacitive means, a commutator for generating a low-frequency alternating current through the high-pressure discharge lamp from a DC voltage present across the first capacitive means, which commutator comprises input terminals coupled to the first capacitive means, a load branch which comprises terminals for connection of the high-pressure discharge lamp and inductive means, characterized in that the first capacitive means are shunted by a branch which comprises a series circuit of second capacitive means and a unidirectional element for blocking a current with which the second capacitive means charge the first capacitive means.

2. A circuit arrangement as claimed in claim 1, wherein the branch in addition comprises an inductive element shunted by a series arrangement of an impedance and a unidirectional element.

3. A circuit arrangement as claimed in claim 2, wherein the impedance comprises an ohmic resistor.

4. A circuit arrangement as claimed in claim 1, wherein the commutator comprises a bridge circuit.

5. A circuit arrangement as claimed in claim 2, wherein the commutator comprises a bridge circuit.

6. A circuit arrangement as claimed in claim 3, wherein the commutator comprises a bridge circuit.

\* \* \* \* \*